United States Patent
Suzuki et al.

(10) Patent No.: US 7,347,479 B2
(45) Date of Patent: Mar. 25, 2008

(54) SUNVISOR DEVICE FOR A VEHICLE

(75) Inventors: Hiromi Suzuki, Kakegawa (JP); Hidetoshi Suzuki, Hamamatsu (JP)

(73) Assignee: Asmo Co., Ltd., Kosai-shi, Shizuoka-ken (JP)

( * ) Notice: Subject to any disclaimer, the term of this patent is extended or adjusted under 35 U.S.C. 154(b) by 290 days.

(21) Appl. No.: 11/110,053

(22) Filed: Apr. 20, 2005

(65) Prior Publication Data

US 2005/0264021 A1     Dec. 1, 2005

(30) Foreign Application Priority Data

Apr. 21, 2004     (JP)     ............... 2004-125876

(51) Int. Cl.
*B60J 3/02* (2006.01)

(52) U.S. Cl. .................... 296/97.1; 296/97.4; 296/97.8

(58) Field of Classification Search ............... 296/210, 296/97.8, 97.1, 97.4; 160/DIG. 3, DIG. 2
See application file for complete search history.

(56) References Cited

U.S. PATENT DOCUMENTS

| | | | | |
|---|---|---|---|---|
| 4,874,938 A * | 10/1989 | Chuang | .................... | 250/203.4 |
| 5,714,751 A * | 2/1998 | Chen | ........................ | 250/203.4 |
| 6,666,493 B1* | 12/2003 | Naik | .......................... | 296/97.4 |
| 7,108,307 B1* | 9/2006 | Sahara et al. | ............... | 296/97.4 |
| 7,199,767 B2* | 4/2007 | Spero | ........................... | 345/7 |
| 7,232,176 B1* | 6/2007 | Dopwell | ..................... | 296/97.9 |
| 2005/0007552 A1* | 1/2005 | Fergason et al. | ............. | 351/210 |
| 2006/0140502 A1* | 6/2006 | Tseng et al. | ................. | 382/275 |
| 2006/0175859 A1* | 8/2006 | Isaac | .......................... | 296/97.4 |
| 2006/0279101 A1* | 12/2006 | Sahara et al. | ............... | 296/97.8 |

FOREIGN PATENT DOCUMENTS

| | | | | | |
|---|---|---|---|---|---|
| JP | 362166110 A | * | 7/1987 | ................. | 296/97.4 |
| JP | 402200518 A | * | 8/1990 | ................. | 296/97.4 |
| JP | 403021559 A | * | 1/1991 | ................. | 296/97.4 |
| JP | 403284413 A | * | 12/1991 | ................. | 296/97.4 |
| JP | 5-34013 | | 5/1993 | | |
| JP | 2002087060 A | * | 3/2002 | | |
| JP | 2002-331835 | | 11/2002 | | |
| JP | 2003-260933 | | 9/2003 | | |

\* cited by examiner

*Primary Examiner*—Jason S. Morrow
(74) *Attorney, Agent, or Firm*—Colin P. Cahoon; Carstens & Cahoon, LLP

(57) ABSTRACT

Assume that the position of a sun visor main body is adjusted by an occupant when incident light having the incident angle $\theta 1$ has entered a vehicle passenger compartment. Then, a straight line L1 is obtained that passes through the distal end position S1 of the moved sun visor main body and is inclined by the same angle as the incident angle $\theta 1$. At this time, the intersection between a straight line Y1, which passes through an eye position P0 of a average sized person and extends along the vertical direction of a vehicle, and the straight line L1 is estimated as an eye position P1 of the occupant. Thereafter, a light blocking control is performed in accordance with the estimated eye position P1.

17 Claims, 8 Drawing Sheets

SUNVISOR DEVICE FOR A VEHICLE

BACKGROUND OF THE INVENTION

The present invention relates to a vehicle sun visor apparatus that operates to automatically block incident light that enters a vehicle passenger compartment such as direct sunlight.

In the prior art, sun visor apparatuses are provided above a driver's seat and a front passenger seat of a vehicle to block light that enters the vehicle such as direct sunlight. The sun visor apparatuses prevent incident light from reaching the actual eye positions of the occupants, and prevent the occupants from being dazzled by the incident light. Such sun visor apparatuses are configured to block light of a predetermined area including the actual eye position of the occupant by manipulating a sun visor main body provided in the vehicle. However, in these days, a sun visor apparatus has been proposed that automatically operates in accordance with the actual eye position of the occupant, especially the driver.

Such an automatic sun visor apparatus is disclosed in, for example, Japanese Laid-Open Utility Model Publication No. 5-34013, Japanese Laid-Open Patent Publication No. 2002-331835, and Japanese Laid-Open Patent Publication No. 2003-260933.

The sun visor apparatus disclosed in the publication No. 5-34013 includes a radiation sensor, which detects the amount of radiation of the direct sunlight, a liquid crystal panel located at the upper portion of a windshield of the vehicle in a strip-like form, and a liquid crystal panel control section, which controls the permeability state of the liquid crystal panel in accordance with the output of the radiation sensor. The radiation sensor is located on both sides of the headrest, that is, in the vicinity of the actual eye position. Then, the liquid crystal panel control section determines whether the output of the radiation sensor exceeds a threshold value. If the output of the radiation sensor exceeds the threshold value, the liquid crystal panel is made nonpermeable to block direct sunlight.

The sun visor apparatus disclosed in the publication No. 2002-331835 includes two cameras, a light blocking section, which is located on the windshield and changes the light blocking area for blocking direct sunlight, and a control ECU, which controls operation of the light blocking section. The image of the face of the occupant in the seat is taken by the cameras, and the actual eye position of the occupant is detected in accordance with the shot image of the face. Furthermore, part of the shot image of the face is extracted and the brightness of the extracted image is compared with a predetermined reference value. If the brightness of the extracted image is higher than the reference value, the range of the sun visor is specified in accordance with the detected actual eye position of the occupant to block the direct sunlight that enters the windshield.

The sun visor apparatus disclosed in the publication No. 2003-260933 includes a camera for shooting the face of the occupant and a sun visor main body stored in a storage box. The sun visor apparatus also includes an eye image extracting section, a pupil size detection section, an illumination detection section, a memory, a glare determination section, and the sun visor control section for controlling operation of the sun visor main body. The eye image extracting section extracts the image of the eyes from the face image of the occupant shot by the camera. Then, the pupil size detection section detects the size of the pupils of the extracted eye image, and the illumination detection section detects the illumination of light that shines on the eyes of the occupant from the brightness of the eye image. The memory stores information such as the size of the pupils and the illumination when the occupant does not feel the glare. The glare determination section compares the information stored in the memory with the size of the pupils detected from the eye image and the illumination to determine whether the occupant feels the glare. A glare adjusting section outputs a signal to the sun visor control section based on the determination. The sun visor control section outputs a signal for adjusting the advancement and retraction of the sun visor main body to the storage box. Based on the signal, the sun visor main body advances or retracts from the storage box to block the direct sunlight.

However, since the actual eye position of the occupant when seated differs depending on an individual occupant, it is difficult to detect the actual eye position of the occupant by providing the radiation sensor on the headrest as disclosed in the publication No. 5-34013. The area that actually requires blocking of light extends to the position lower than the actual eye position. Therefore, if it is difficult to estimate the actual eye position of an individual occupant, it is difficult to perform the light blocking control in accordance with the eye position of the occupant.

Furthermore, the sun visor apparatuses disclosed in the publication No. 2002-331835 and the publication No. 2003-260933 require various configurations such as cameras. Therefore, the sun visor apparatuses undesirably become complicated and expensive.

Accordingly, it is an objective of the present invention to provide a simple vehicle sun visor apparatus that easily estimates an eye position of an occupant and performs an appropriate light blocking control using the estimated eye position.

SUMMARY OF THE INVENTION

To achieve the above objective, the first invention provides a vehicle sun visor apparatus, which includes a light blocking device, a light receiving sensor, and a control device. The light blocking device has a sun visor main body provided on a vehicle to block incident light. The light receiving sensor outputs an incident light detection signal for specifying the incident angle of the incident light. The control device specifies the incident angle of the incident light based on the incident light detection signal and performs a light blocking control to block the incident light with the light blocking device. The control device stores a reference eye position of an occupant of the vehicle. The control device estimates, as an eye position of the occupant, the intersection between a straight line that passes through the reference eye position and extends along the vertical direction of the vehicle and a straight line that passes through the distal end position of the sun visor main body arranged at a position appropriate for shielding the occupant from light and is inclined by the same angle as the incident angle specified by the control device, and performs the light blocking control in accordance with the estimated eye position.

The second invention provides a vehicle sun visor apparatus, which includes a light blocking device, a light receiving sensor, and a control device. The light blocking device has a sun visor main body provided on a vehicle to block incident light. The light receiving sensor outputs an incident light detection signal for specifying the incident angle of the incident light. The control device specifies the incident angle of the incident light based on the incident light detection signal and performs a light blocking control to block the incident light with the light blocking device. The control device stores a reference eye position of an occupant of the vehicle. The control device estimates, as an eye position of the occupant, the intersection between a first straight line that passes through the distal end position of the sun visor main body arranged at a position appropriate for shielding the occupant from light and is inclined by the same angle as the incident angle specified by the control device and a second straight line that passes through the reference eye position and is perpendicular to the first straight line, and performs the light blocking control in accordance with the estimated eye position.

The third invention provides a vehicle sun visor apparatus, which includes a light blocking device, a light receiving sensor, and a control device. The light blocking device has a sun visor main body provided on a vehicle to block incident light. The light receiving sensor outputs an incident light detection signal for specifying the incident angle of the incident light. The control device specifies the incident angle of the incident light based on the incident light detection signal and performs a light blocking control to block the incident light with the light blocking device. The control device estimates, as an eye position of an occupant, the intersection between two straight lines, each of which passes through the distal end position of the sun visor main body adjusted to two different positions by the occupant and is inclined by the same angle as the incident angle at the time of each adjustment, and performs the light blocking control in accordance with the estimated eye position.

The fourth invention provides a vehicle sun visor apparatus, which includes a light blocking device, a light receiving sensor, and a control device. The light blocking device has a sun visor main body provided on a vehicle to block incident light. The light receiving sensor outputs an incident light detection signal for specifying the incident angle of the incident light. The control device specifies the incident angle of the incident light based on the incident light detection signal and performs a light blocking control to block the incident light with the light blocking device. On an xy-coordinate plane including an x-axis that represents the fore-and-aft direction of the vehicle and a y-axis that represents the vertical direction of the vehicle, the control device estimates, as an eye position of an occupant, the position of the coordinate values obtained as the average of the coordinate values of the intersections formed by straight lines, the number of which is n (n is a natural number greater than or equal to three), each of which passing through the coordinate values of the distal end position of the sun visor main body adjusted to a plurality of different positions by the occupant and being inclined by the same angle as the incident angle at the time of each adjustment. The control device performs the light blocking control in accordance with the estimated eye position.

The fifth invention provides a vehicle sun visor apparatus, which includes a light blocking device, a light receiving sensor, and a control device. The light blocking device has a sun visor main body provided on a vehicle to block incident light. The light receiving sensor detects the incident angle of the incident light. The control device performs a light blocking control to block the incident light with the light blocking device in accordance with the incident angle of the incident light. The apparatus includes selecting means for selecting either of a manual mode in which an occupant adjusts the position of the sun visor main body and an automatic mode in which the control device adjusts the position of the sun visor main body. The control device estimates the eye position of the occupant based on the stopped position of the sun visor main body adjusted by the occupant while the manual mode is selected and the incident angle of the incident light at that time, and performs the light blocking control in accordance with the estimated eye position when the automatic mode is selected.

The sixth invention provides a vehicle sun visor apparatus, which includes a light blocking device, a light receiving sensor, and a control device. The light blocking device has a sun visor main body provided on a vehicle to block incident light. The light receiving sensor specifies the incident angle of the incident light. The control device performs a light blocking control to block the incident light with the light blocking device in accordance with the incident angle of the incident light. The sun visor apparatus includes selecting means and instructing means. The selecting means selects either of a manual mode in which the occupant adjusts the position of the sun visor main body and an automatic mode in which the control device adjusts the position of the sun visor main body. The instructing means instructs the control device to estimate the eye position of the occupant. When being instructed by the instructing means, the control device estimates the eye position of the occupant based on the stopped position of the sun visor main body at the time of the instruction and the incident angle of the incident light at that time, and performs the light blocking control in accordance with the estimated eye position when the automatic mode is selected.

BRIEF DESCRIPTION OF THE PREFERRED EMBODIMENTS

First Embodiment

A first embodiment of the present invention will now be described with reference to the drawings.

Figure 1:
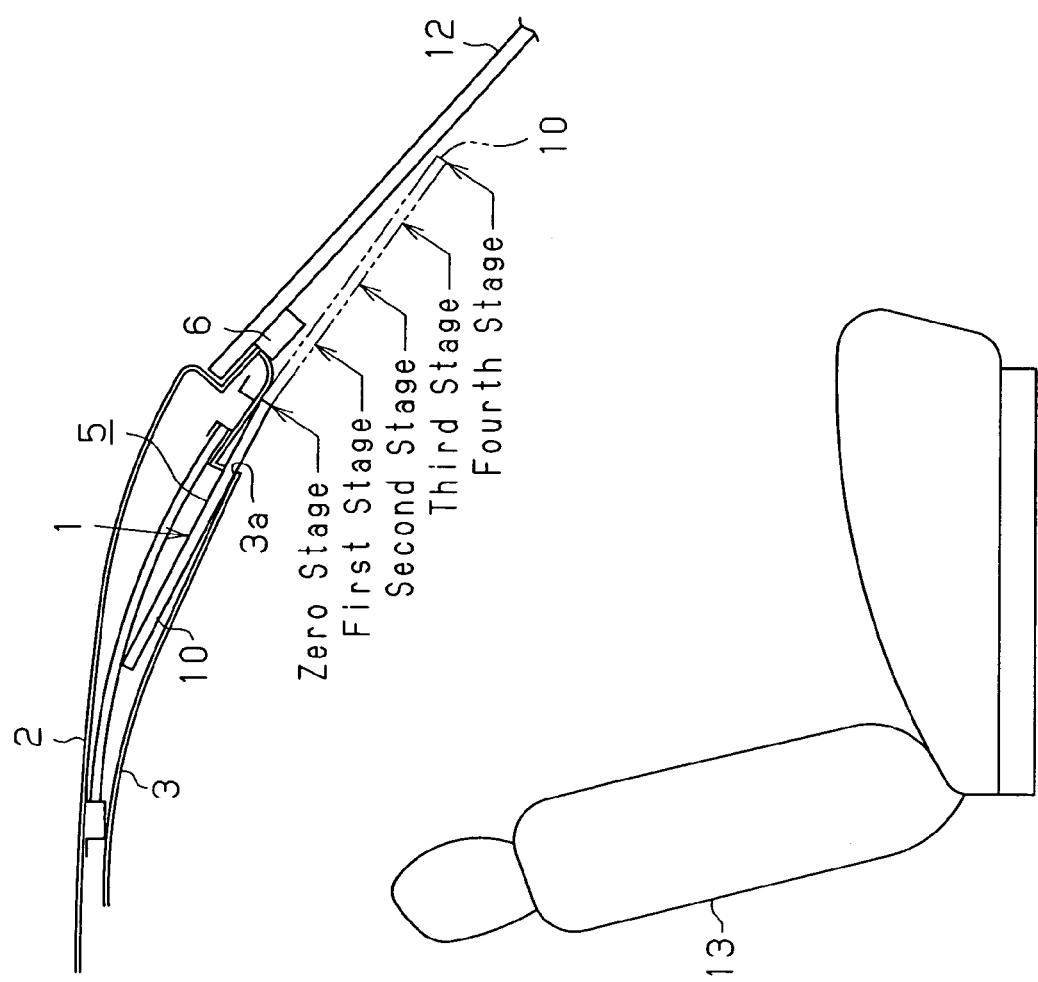
FIG. 1 is a schematic diagram illustrating a vehicle sun visor apparatus.
Figure 4:
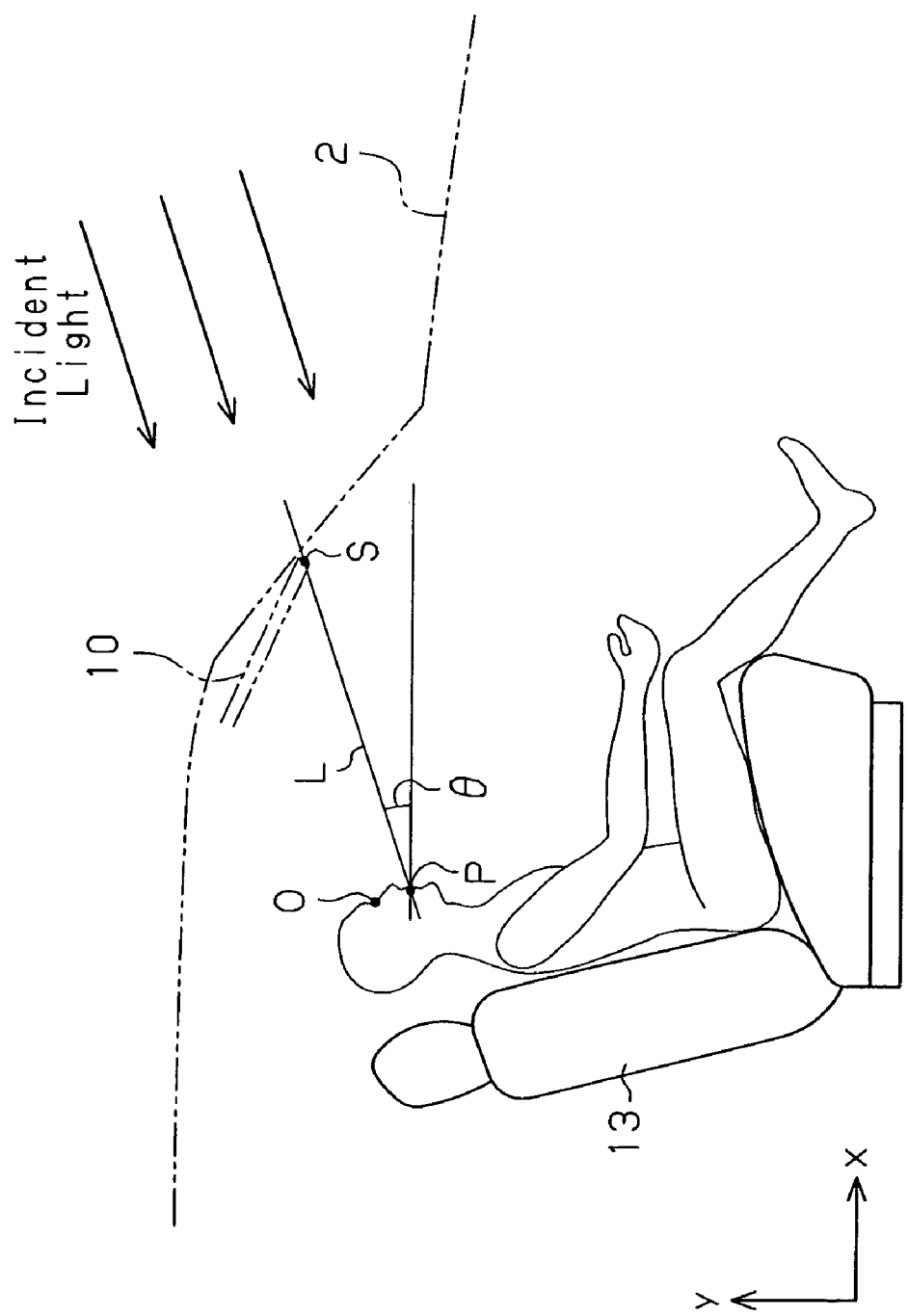
FIG. 4 is a diagram illustrating a straight line that passes through the distal end position of the sun visor main body and is inclined by the same angle as the incident angle of incident light.

FIG. 1 shows a vehicle sun visor apparatus 1 according to the first embodiment. As shown in FIG. 4, the sun visor apparatus 1 prevents an occupant (a driver in the first embodiment) of a vehicle from being dazzled by direct sunlight shining on the actual eye position O of the occupant. More specifically, the sun visor apparatus 1 estimates, as the eye position P, the position to which the sun visor apparatus 1 is shifted downward from the actual eye position O of the occupant by an amount necessary for blocking sunlight to prevent dazzlement of the occupant. A light blocking control is performed in accordance with the estimated eye position P.

As shown in FIG. 1, the sun visor apparatus 1 is provided on a ceiling 3 of a vehicle 2. The sun visor apparatus 1 includes a light blocking device 5, a light receiving sensor 6, a control device 7, and a manipulation section 8 as shown in FIG. 2.

As shown in FIG. 1, the light blocking device 5 is accommodated in and secured to the ceiling 3. The light blocking device 5 includes a sun visor main body 10, a drive mechanism, which is not shown, and a drive motor 11 (see FIG. 2). The sun visor main body 10 is rectangular and formed with an opaque member to block incident light. An opening portion 3a is formed at the front end of the ceiling 3. When the drive motor 11 is driven, the sun visor main body 10 advances from the opening portion 3a via the drive mechanism or is stored in the ceiling 3 in accordance with the drive direction. The amount of advancement of the sun visor main body 10 from the opening portion 3a is divided into some stages from the state where the sun visor main body 10 is stored in the ceiling 3 to the state where the sun visor main body 10 is advanced to the maximum. For example, in the first embodiment, the stored state is referred to as a zero stage. The length of the sun visor main body 10 along the advancing direction in a state where the sun visor main body 10 is advanced to the maximum is divided into four to have first to fourth stages. Thus, the sun visor main body 10 can be adjusted in five stages as a whole. When the sun visor main body 10 is advanced to the maximum, the sun visor main body 10 covers a predetermined range above the center of the windshield 12 on the driver's side.

Figure 2:
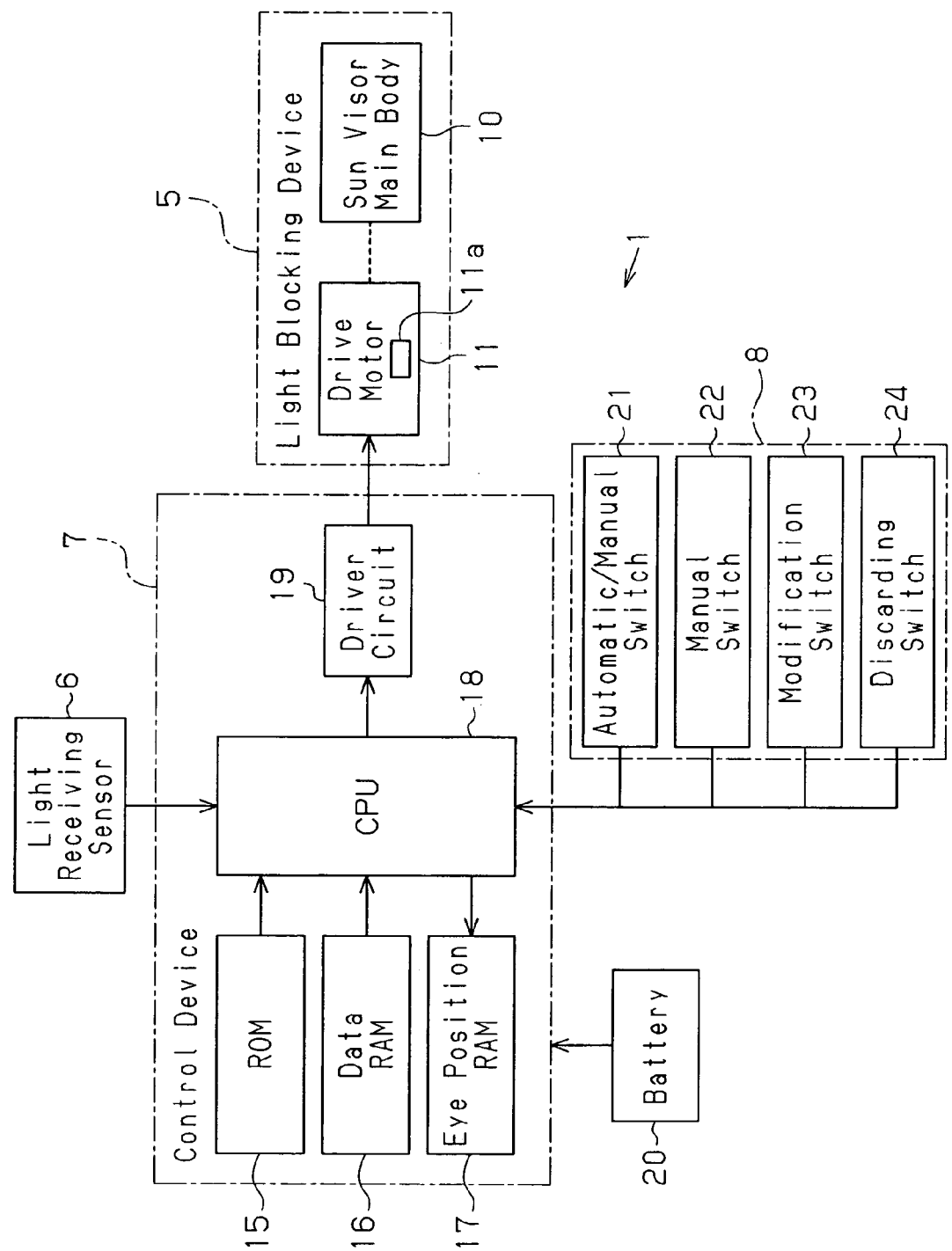
FIG. 2 is a block diagram illustrating the configuration of the vehicle sun visor apparatus.

As shown in FIG. 2, a rotation detection device 11a is integrally formed with the drive motor 11. The rotation detection device 11a obtains a pulse signal that is in synchronization with the rotation of the drive motor 11 and outputs the pulse signal to the control device 7. The rotation detection device 11a has, for example, two hall elements, each of which outputs a pulse signal that is in synchronization with the rotation of the drive motor 11. The pulse signals output from the hall elements have a predetermined phase difference. The control device 7 detects the rotation direction of the drive motor 11 in accordance with the phase difference of the pulse signals. The control device 7 also counts the number of pulses based on the edge of the pulse signal and detects the position of the sun visor main body 10 in accordance with the count value.

Figure 3A:
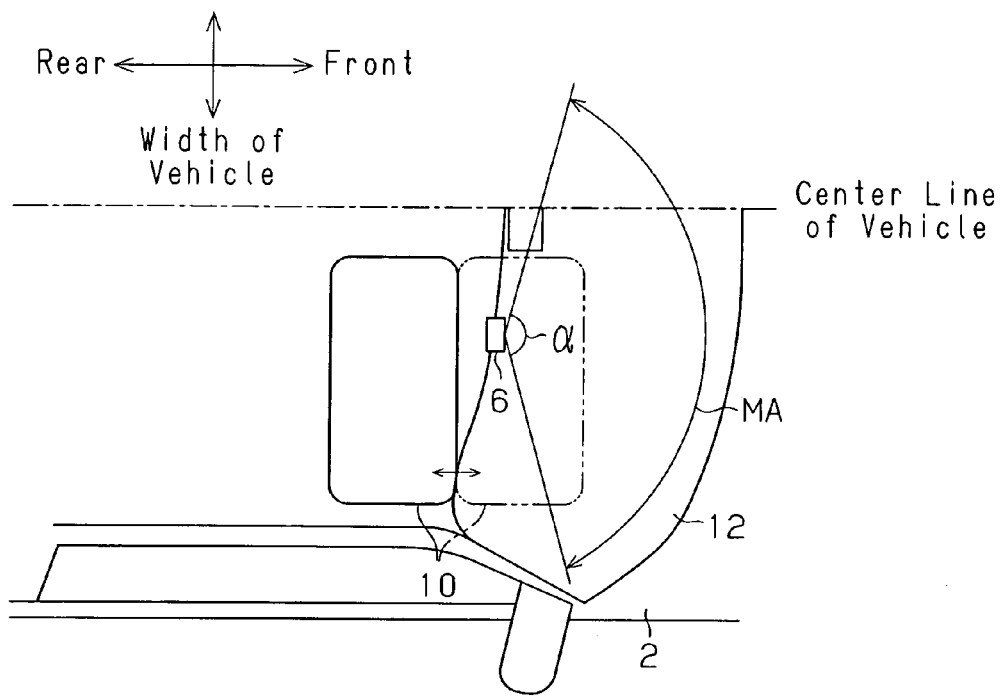
FIG. 3(a) is a diagram illustrating a measurement area in the horizontal direction.
Figure 3B:
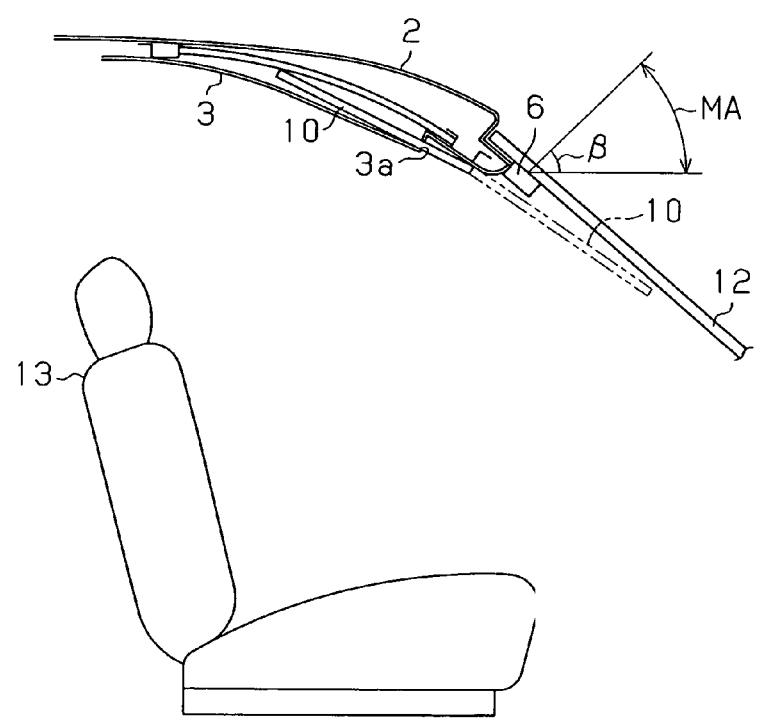
FIG. 3(b) is a diagram illustrating the measuring area in the vertical direction.

As shown in FIGS. 3(a) and 3(b), the light receiving sensor 6 includes light receiving elements (not shown) and is located substantially in front of a seat 13 in which the occupant is seated on the inner surface of the upper end of the windshield 12. The light receiving sensor 6 detects the intensity, the incident angle θ (see FIG. 4) in the vertical direction, and the incident angle in the horizontal direction of the incident light that enters the measuring area MA (a range indicated by the angle α (in FIG. 3(a) for the horizontal direction and a range indicated by the angle β in FIG. 3(b) for the vertical direction). The measuring area MA is set to a minimum range that needs to be shielded from light by the sun visor main body 10 when an average sized person is seated in the seat 13 in an appropriate posture. When incident light enters the measuring area MA, the light receiving sensor 6 outputs incident light detection signals that correspond to the intensity of the incident light, the incident angle θ in the vertical direction, and the incident angle in the horizontal direction to the control device 7.

As shown in FIG. 2, the control device 7 includes a ROM 15, a data RAM 16, a storage portion, which is an eye position RAM 17 in the first embodiment, a CPU 18, and a driver circuit 19. The control device 7 is supplied with drive power source from a battery 20.

The ROM 15 stores the eye position P0 of an average sized person as a reference eye position. The reference eye position P0 is a position shifted downward from the actual eye position O by an amount required to block light to prevent dazzlement of the occupant so that the incident light does not shine on the actual eye position O of the average sized person. The reference eye position P0 is set as the lowest point of a range in which light is blocked by the sun visor main body 10.

The data RAM 16 includes data boxes (two in this embodiment). The distal end position S of the sun visor main body 10 and the incident angle θ of the incident light in the vertical direction at that time are stored in each data box (see FIG. 4). The distal end position S of the sun visor main body 10 is detected by the control device 7 in accordance with the pulse signal sent from the rotation detection device 11a. When the distal end position S of the sun visor main body 10 and the incident angle θ of the incident light in the vertical direction at that time are updated, the old data values among the data values stored in the data boxes are deleted.

The eye position RAM 17 stores the eye position P estimated by the CPU 18 in accordance with the distal end position S of the sun visor main body 10 stored in the data RAM 16 and the incident angle θ of the incident light in the vertical direction at that time.

The CPU 18 controls the vehicle sun visor apparatus 1. The CPU 18 estimates the eye position P by computation in accordance with the data stored in the data RAM 16. The CPU 18 then performs the light blocking control to operate the light blocking device 5 based on the incident light detection signals output from the light receiving sensor 6 and the estimated eye position P. That is, the CPU 18 computes the incident angle θ of the incident light based on the incident light detection signals output from the light receiving sensor 6. The CPU 18 also obtains the intensity of the incident light that enters the measuring area MA based on the incident light detection signals output from the light receiving sensor 6. When the incident intensity of the incident light is greater than or equal to a predetermined intensity, the CPU 18 performs the light blocking control, in accordance with the estimated eye position P and a control map, to operate the sun visor main body 10 such that the incident light does not shine on the actual eye position O of the occupant. The control map defines the advancing amount (advancing stage in the first embodiment) of the sun visor main body 10 corresponding to the incident angle θ of the incident light in a case where the light blocking control is performed based on the eye position P0 of the average sized person. For example, the advancing amount of the sun visor main body 10 that the average sized person feels appropriate and the incident angle θ of the incident light at that time are obtained through experiments. The obtained advancing amount of the sun visor main body 10 and the incident angle θ of the incident light are stored in the ROM 15 relative to each other as the control map. Then, when the CPU 18 performs the light blocking control based on the estimated eye position P, the CPU 18 obtains the data of the advancing amount of the sun visor main body 10 corresponding to the incident angle θ at that time from the control map, and blocks the light by relatively changing the advancing amount in accordance with the eye position P.

Based on a control signal sent from the CPU 18, the driver circuit 19 supplies the drive motor 11 with a drive current corresponding to the control signal. The drive motor 11 rotates forward or in reverse in accordance with the supplied drive current. The sun visor main body 10 advances or retracts by the rotation.

The manipulation section 8 includes selecting means, which is an automatic/manual switch 21 in the first embodiment, adjusting means, which is a manual switch 22 in the first embodiment, instruction means, which is a modification switch 23 in the first embodiment, and discarding means, which is a discarding switch 24 in the first embodiment.

According to the vehicle sun visor apparatus 1 of the first embodiment, the position of the sun visor main body 10 is adjusted in either a manual mode, in which the occupant manually adjusts the position of the sun visor main body 10, or an automatic mode, in which the control device 7 adjusts the position of the sun visor main body 10. The automatic/manual switch 21 selects in which of the manual mode and the automatic mode the position of the sun visor main body 10 is adjusted.

The manual switch 22 is for the occupant to adjust the advancing amount of the sun visor main body 10. When the occupant manipulates the manual switch 22, the sun visor main body 10 is advanced or retracted. When the occupant manipulates the manual switch 22, the sun visor apparatus 1 is switched to the manual mode in which the position of the sun visor main body 10 is manually adjusted by the occupant.

The modification switch 23 is for the occupant to instruct the CPU 18 to estimate the eye position P. When the modification switch 23 is manipulated, the CPU 18 estimates the eye position P, and the estimated eye position P is stored in the eye position RAM 17.

The discarding switch 24 is for deleting the data stored in the data RAM 16, that is, the distal end position S of the sun visor main body 10 and the incident angle θ of the incident light in the vertical direction at that time and the estimated eye position P stored in the eye position RAM 17.

A method for estimating the eye position P according to the vehicle sun visor apparatus 1 will now be described with reference to FIGS. 4 to 6. To facilitate understanding, the incident angle and the like of the incident light are exaggerated in FIGS. 5 and 6.

As shown in FIG. 4, the eye position P of the occupant is estimated using a straight line L, which passes through the distal end position S of the sun visor main body 10 arranged at a position appropriate for shielding the occupant from light and is inclined by the same angle as the incident angle θ of the incident light in the vertical direction. The straight line L is calculated by the CPU 18 based on the distal end position S of the sun visor main body 10 stored in the data RAM 16 and the incident angle θ of the incident light in the vertical direction at that time. In the first embodiment, the eye position P of the occupant is estimated using two straight lines L, which pass through the distal end positions S of the sun visor main body 10 adjusted to two different positions by the occupant. Each straight line L is inclined by the same angle as the incident angle θ when the sun visor main body 10 is adjusted.

Figure 5A:
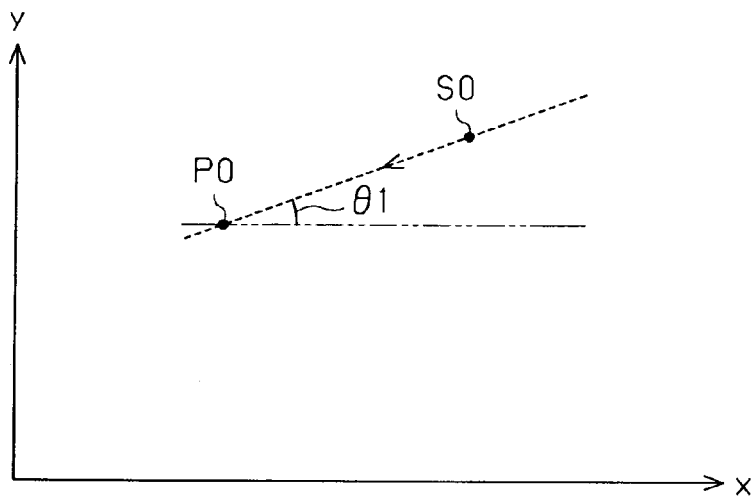
FIG. 5(a) is a diagram showing the eye position of an average sized person.

The ROM 15 stores, as shown in FIG. 5(a), the eye position P0 obtained when the average sized person is seated in the seat 13, the incident angle θ1 of the incident light in the vertical direction that enters the measuring area MA, and the distal end position S0 of the sun visor main body 10 located at a position appropriate for the average sized occupant when the incident light with the incident angle θ1 enters the windshield 12. In the x-y coordinate of FIG. 5 (a), the fore-and-aft direction of the vehicle 2 is referred to as an x-axis, and the vertical direction of the vehicle 2 is referred to as a y-axis (see FIG. 4).

Figure 5B:
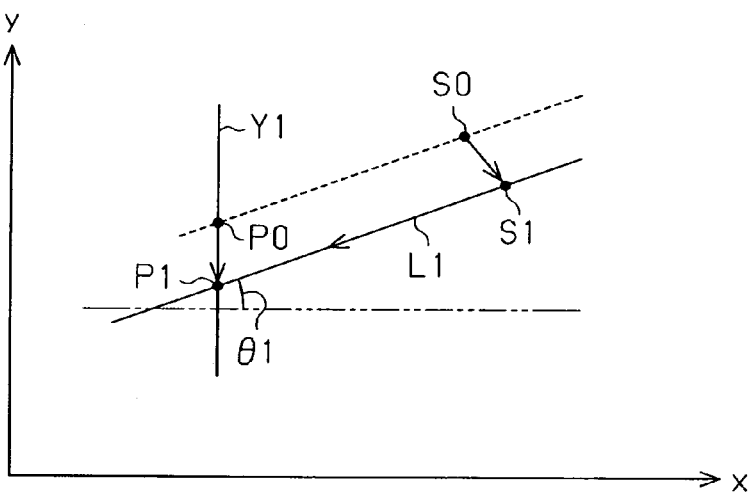
FIG. 5(b) is a diagram showing a method for estimating the eye position after the first adjustment.

Assume that the occupant adjusts the sun visor main body 10 to be advanced (first adjustment) as shown in FIG. 5(b) when the incident light with the incident angle θ1 enters the windshield 12. A straight line L1 is obtained that passes through the distal end position S1 of the moved sun visor main body 10 and is inclined by the same angle as the incident angle θ1. At this time, the intersection between a straight line Y1, which passes through the eye position P0 of the average sized person and extends along the vertical direction of the vehicle 2 (y-axis direction in FIG. 5(b)), and the straight line L1 is estimated as the eye position P1 of the occupant. FIG. 5(b) shows a state where the sun visor main body 10 is adjusted to be advanced. However, in a case where the sun visor main body 10 is adjusted to be retracted, the eye position P is estimated in the same manner. That is, the intersection between the straight line Y1, which passes through the reference eye position P0 of the average sized person and extends along the vertical direction of the vehicle 2, and the straight line L1, which is obtained from the distal end position S of the sun visor main body 10 and the incident angle θ of the incident light in the vertical direction at that time is estimated as the eye position P1 of the occupant.

After the first adjustment of the position of the sun visor main body 10, if the estimated eye position P1 is different from the eye position P that the occupant feels appropriate (such as when the occupant is changed or when the first adjustment of the position of the sun visor main body 10 is not appropriate), the eye position P of the occupant needs to be estimated again. As one example, a case where the incident angle of the incident light is changed from the incident angle θ1 to the incident angle θ2, and thus the eye position P of the occupant needs to be estimated will be described with reference to FIG. 5(c).

Figure 5C:
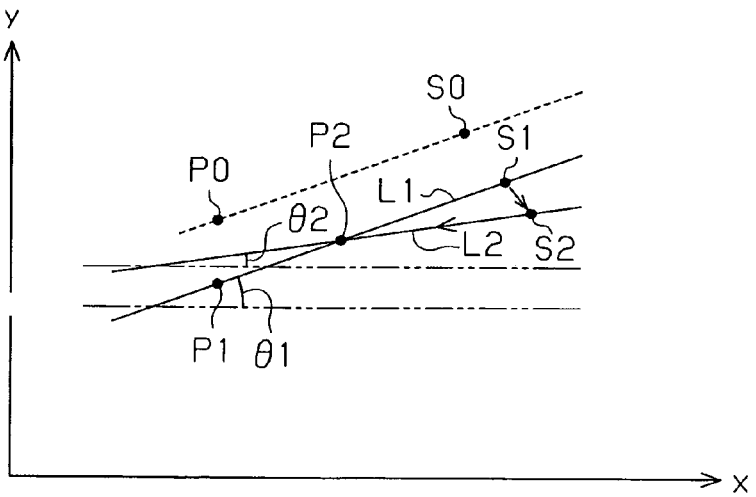
FIG. 5(c) is a diagram showing a method for estimating the eye position after the second adjustment.

Assume that the incident angle of the incident light is changed from the incident angle θ1 to the incident angle θ2, and the occupant adjusts the position of the sun visor main body 10 to be further advanced (second adjustment) as shown in FIG. 5(c). Then, a straight line L2 is obtained that passes through the distal end position S2 of the moved sun visor main body 10 and is inclined by the same angle as the incident angle θ2. At this time, the intersection between the straight line L1 obtained by the first adjustment and the straight line L2 obtained by the second adjustment is estimated as the eye position P2 of the occupant.

When the vehicle sun visor apparatus 1 is used for the first time or immediately after the data stored in data RAM 16 (the distal end position S of the sun visor main body 10 and the incident angle θ of the incident light at that time) is deleted, the eye position P is estimated in the same manner as when the first adjustment shown in FIG. 5(b) is performed. When the adjustment of the position of the sun visor main body 10 is performed m times (m is a natural number greater than or equal to two), the eye position P is estimated in the same manner as the second adjustment shown in FIG. 5(c). That is, the intersection between the straight line L2 obtained in the mth adjustment and the straight line L1 obtained in the (m−1)th adjustment is estimated as the eye position P2 of the occupant.

There is no problem when the normal eye position P is estimated in accordance with the above mentioned method, but the estimated eye position P might be abnormal. A method for determining whether the estimated eye position P is normal will now be described. The determination of whether the estimated eye position P is normal is performed by determining whether the intersection between the two straight lines L is at the normal position (that is, whether the eye position P is at a position that enables the sun visor main body 10 to perform the light blocking control when the intersection is estimated as the eye position).

Figure 6:
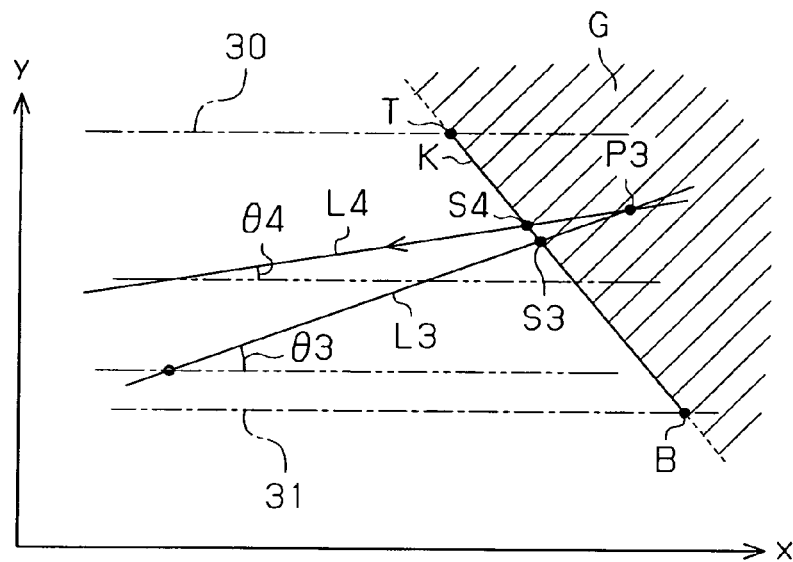
FIG. 6 is a diagram showing a method for determining an abnormal intersection (eye position) according to a first embodiment.

A straight line K in FIG. 6 shows the path of the distal end position S of the sun visor main body 10. In FIG. 6, the incident light enters the vehicle 2 from the right side of the straight line K. That is, a shaded area G on the right side of the straight line K is the outside of the vehicle 2. Therefore, as shown in FIG. 6, when the mth adjustment is performed, if the intersection P3 between a straight line L4 obtained by the mth adjustment and a straight line L3 obtained by the (m−1)th adjustment is located in the area G, which is the outside of the vehicle 2, the CPU 18 determines that the intersection P3, that is, the eye position is abnormal. In FIG. 6, the straight line L3 is a straight line, which passes through the distal end position S3 of the sun visor main body 10 and is inclined by the same angle as the incident angle θ3 of the incident light in the vertical direction, and the straight line L4 is a straight line, which passes through the distal end position S4 of the sun visor main body 10 and is inclined by the same angle as the incident angle θ4 of the incident light in the vertical direction.

Also, in a case where the intersection between the straight line L3 and the straight line L4 is located upward of the distal end position T of the completely retracted sun visor main body 10 (upward of a dashed line 30 in FIG. 6), the CPU 18 determines that the intersection, that is, the eye position is abnormal. Furthermore, in a case where the intersection between straight line L3 and the straight line L4 is located downward of the distal end position B of the completely advanced sun visor main body 10 (downward of a dashed line 31 in FIG. 6), the CPU 18 determines that the intersection, that is, the eye position is abnormal. When the intersection between the straight line L3 and the straight line L4 is located in the passenger compartment (left side of the straight line K in FIG. 6), below the distal end position T of the completely retracted sun visor main body 10, and upward of the distal end position B of the completely advanced sun visor main body 10, the CPU 18 determines that the intersection, that is, the eye position is normal.

The operations of the vehicle sun visor apparatus 1 configured as described above will now be described.

When an ignition switch (not shown) of the vehicle 2 is switched on, a power switch (not shown) of the sun visor apparatus 1 is switched on. Immediately after the power switch of the sun visor apparatus 1 is switched on, the sun visor apparatus 1 performs the light blocking control in a state that is the same as when the automatic mode is selected by the automatic/manual switch 21.

In a case where the automatic mode is selected by the automatic/manual switch 21, if the estimated eye position P of the occupant is stored in the eye position RAM 17, the light blocking control is performed based on the eye position P in accordance with the incident angle θ of the incident light using the control map. If the estimated eye position P is not stored in the eye position RAM 17, the light blocking control is performed based on the eye position P0 of the average sized person stored in ROM 15 in accordance with the incident angle θ of the incident light using the control map.

If the position of the sun visor main body 10 operated by the control device 7 while the automatic mode is selected is not appropriate, the occupant manipulates the manual switch 22 to advance or retract the sun visor main body 10 to the appropriate position. When the manual switch 22 is manipulated, the vehicle sun visor apparatus 1 shifts to the manual mode.

After adjusting the position of the sun visor main body 10, when the occupant manipulates the modification switch 23, the distal end position S of the sun visor main body 10 after the adjustment and the incident angle θ of the incident light at that time are stored in the data RAM 16. Then, the CPU 18 estimates, as the eye position P of the occupant, the intersection between the two straight lines L obtained from two sets of the distal end position S and the incident angle θ stored in the data RAM 16. At this time, the CPU 18 determines whether the estimated eye position P is abnormal. If the estimated eye position P is determined to be abnormal, the data (the distal end position S and the incident angle θ) that determines the old straight line L among the two straight lines L forming the abnormal intersection is deleted from the data RAM 16. Then, the eye position P of the occupant is estimated again. The estimated eye position P is then stored in the eye position RAM 17. Thereafter, when the automatic mode is selected, the CPU 18 performs the light blocking control based on the estimated eye position P in accordance with the incident angle θ of the incident light using the control map.

Even after the modification switch 23 is manipulated, if the light blocking control performed based on the eye position P stored in the eye position RAM 17 is not appropriate, the occupant manipulates the manual switch 22 again and adjusts the position of the sun visor main body 10, and then manipulates the modification switch 23.

If the discarding switch 24 is manipulated when, for example, the occupant is changed, the data stored in the data RAM 16 and the estimated eye position P stored in the eye position RAM 17 are deleted. If the vehicle sun visor apparatus 1 is in the automatic mode immediately after the discarding switch 24 is manipulated, the light blocking control is performed based on the eye position P0 of the average sized person stored in the ROM 15.

As described above, the first embodiment has the following advantages.

(1) If the data of the eye position P is not stored in the eye position RAM 17, the eye position P is estimated using the eye position P0 stored in the ROM 15 and the straight line L1 that passes through the distal end position S1 of the sun visor main body 10 located at a position appropriate for shielding the occupant from light and is inclined by the same angle as the incident angle θ1 of the incident light. Furthermore, if the position of the sun visor main body 10 is adjusted twice or more, the eye position P is estimated using the two straight lines L (L1, L2) each of which passes through the distal end position S (S1, S2) of the sun visor main body 10 that is appropriately adjusted to two different positions by the occupant and is inclined by the same angle as the incident angle θ (θ1, θ2) of the incident light at the time of the adjustment. That is, when the distal end position S of the sun visor main body 10 and the incident angle θ of the incident light are specified, the eye position P of the occupant is easily estimated by computation of the CPU 18. Furthermore, the actual eye position of the occupant is closely related to the stopped position of the sun visor main body 10 and the incident angle θ of the incident light. Therefore, by estimating the occupant's eye position based on the distal end position S of the sun visor main body 10 adjusted by the occupant and the incident angle θ of the incident light at that time, the estimated eye positions P1, P2 become closer to the actual eye position of the occupant. To prevent dazzlement of the occupant due to the incident light, the actual eye position O of the occupant is simply shielded from the incident light. Therefore, the appropriate light blocking control is performed by blocking light in accordance with the estimated eye position P. Furthermore, the first embodiment does not require a camera or the like to estimate the eye position P of the occupant. Therefore, the apparatus is inexpensive and has a simple structure.

(2) If the estimated eye position P is abnormal (if the eye position P is in the area G), among the two straight lines L that form the intersection P3, which is estimated as the eye position P, the data that determines the old straight line L3 (the distal end position S3 of the sun visor main body 10 and the incident angle θ3 of the incident light at that time) are deleted from the data RAM 16. Therefore, the light blocking control is prevented from being performed based on the abnormal eye position P. Furthermore, since the data that determines the old straight line L3 among the straight lines L that form the intersection is deleted from the data RAM 16, the latest state of the occupant is easily reflected in the eye position P to be estimated again.

(3) When the occupant manipulates the modification switch 23 after adjusting the sun visor main body 10 to the appropriate position, the control device 7 estimates the eye position P of the occupant. Therefore, since the eye position P is estimated only when the occupant desires estimation of the eye position, the light blocking control is performed in accordance with the occupant's preference.

(4) The sun visor apparatus 1 includes the discarding switch 24, which deletes the data stored in the data RAM 16 and the estimated eye position P stored in the eye position RAM 17. Therefore, even if the occupant is changed, the eye position P of the next occupant is estimated without the influence of the eye position P estimated for the former occupant. As a result, the sun visor apparatus 1 performs the appropriate light blocking control for individual occupant.

Second Embodiment

A second embodiment of the present invention will now be described with reference to the drawings. Like or the same reference numerals are given to those components that are like or the same as the corresponding components of the first embodiment and detailed explanations are omitted.

A method for estimating the eye position P according to the vehicle sun visor apparatus 1 of the second embodiment differs from that of the first embodiment. In the second embodiment, the eye position P of the occupant is estimated using three straight lines L that pass through the distal end position S of the sun visor main body 10 and are inclined by the same angle as the incident angle θ of the incident light in the vertical direction. Therefore, in the second embodiment, the data RAM 16 includes three data boxes, and each data box stores the distal end position S of the sun visor main body 10 and the data of the incident angle θ of the incident light in the vertical direction.

A method for estimating the eye position P according to the second embodiment will now be described.

After the first and second adjustments of the sun visor main body 10, the eye position P is estimated in the same manner as the first embodiment as shown in FIGS. 5(*b*) and 5(*c*). Then, if the eye position P estimated after the second adjustment of the position of the sun visor main body 10 differs from the eye position P that the occupant feels most appropriate (when the occupant is changed or when the second adjustment of the position of the sun visor main body 10 is not appropriate), the eye position P of the occupant needs to be estimated again. A case where the incident angle of the incident light is changed to the incident angle θ6 and thus the eye position P of the occupant needs to be estimated will be described with reference to FIG. 7.

Figure 7:
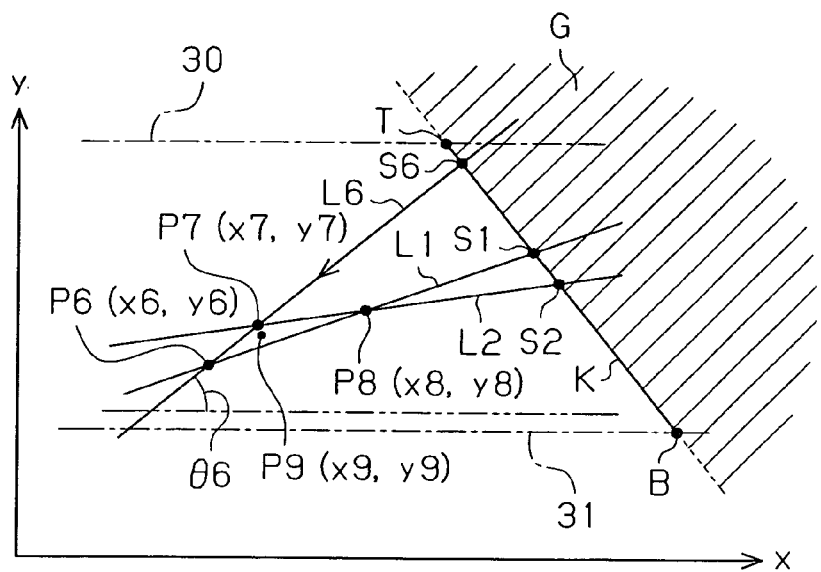
FIG. 7 is a diagram showing a method for estimating the eye position according to a second embodiment.

As shown in FIG. 7, assume that when the incident light having the incident angle θ6 enters the windshield, the occupant performs the third adjustment to retract the sun visor main body 10. In this case, a straight line L6 is obtained that passes through the distal end position S6 of the moved sun visor main body 10 and is inclined by the same angle as the incident angle θ6. An arbitrary xy-coordinate plane is considered that includes an x-axis that represents the fore-and-aft direction of the vehicle 2 and a y-axis that represents the vertical direction of the vehicle 2. The straight lines L1, L2, L6 obtained by the first to third adjustments form three intersections P6, P7, P8 on the xy-coordinate plane. The position of the coordinate values (x9, y9) obtained as the average of the coordinate values (x6, y6), (x7, y7), (x8, y8) of the intersections P6, P7, P8 is estimated as the eye position P9 of the occupant.

The eye position P of the occupant is estimated in the same manner as the first embodiment when the vehicle sun visor apparatus 1 is used for the first time, immediately after deleting the data of the straight line L stored in the data RAM 16, or up to the second adjustment. When the adjustment is performed i times (i is a natural number greater than or equal to three), the eye position P is estimated in the same manner as when the third adjustment is performed as shown in FIG. 7. That is, the position of the coordinate values (x9, y9) obtained as the average of the coordinate values (x6, y6), (x7, y7), (x8, y8) of the three intersections P6, P7, P8, which are formed by the straight line L6 obtained by the ith adjustment, the straight line L2 obtained by the (m−1)th adjustment, and the straight line L1 obtained by the (m−2)th adjustment, is estimated as the eye position P of the occupant.

To prevent estimation of an abnormal eye position P, the average of the coordinate values of the intersections formed by thee straight lines L except the one located at the abnormal position is obtained. A method for determining whether the intersections obtained by the three straight lines are at the normal position will now be described.

Figure 8:
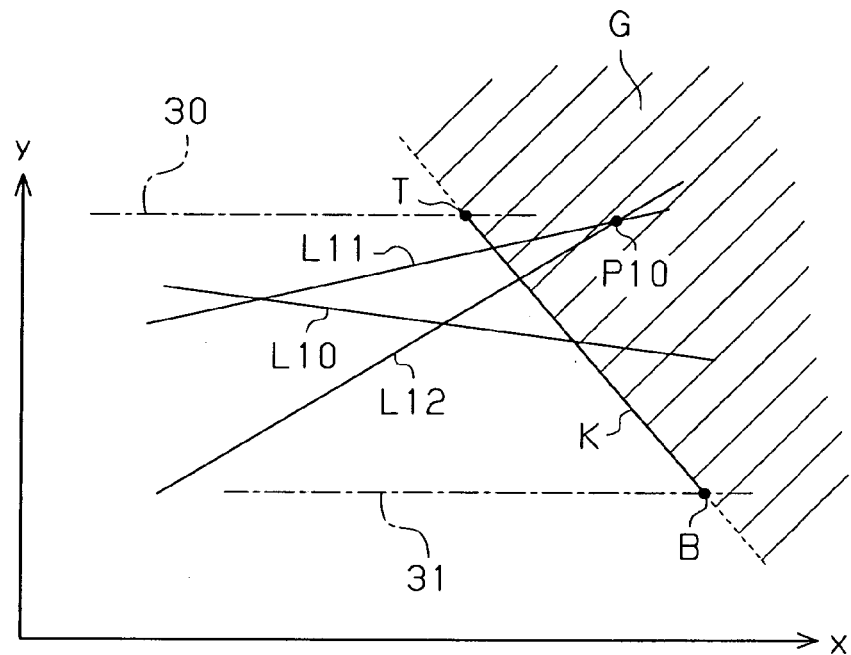
FIG. 8 is a diagram showing a method for determining whether the intersection is at the abnormal position according to the second embodiment.

FIG. 8 shows a straight line L12 obtained in the ith adjustment, a straight line L11 obtained in the (i−1)th adjustment, and a straight line L10 obtained in the (i−2)th adjustment. In FIG. 8, the intersection P10 formed by the straight line L11 and the straight line L12 is located in the area G, which is the outside of the vehicle 2 bounded by the straight line K, which is a path of the distal end position S of the sun visor main body 10. At this time, the intersection P10 formed by the straight line L11 and the straight line L12 is determined to be located at the abnormal position. That is, if there is an intersection located in the area G outside the vehicle 2 among the intersections formed by the three straight lines L, the intersection located in the area G is determined to be located at the abnormal position. Furthermore, among the intersections formed by the three straight lines L, the intersection located upward of the distal end position T of the completely retracted sun visor main body 10 (upward of the dashed line 30 in FIG. 8) or the intersection located downward of the distal end position B of the completely advanced sun visor main body 10 (downward of the dashed line 31 in FIG. 8) is determined to be located at the abnormal position. When the intersections of the straight lines L10, L11, L12 are located in the passenger compartment (leftward of the straight line K in FIG. 8), downward of the distal end position T of the completely retracted sun visor main body 10, and upward of the distal end position B of the completely advanced sun visor main body 10, the intersections are determined to be at the normal position.

Next, the operations of the vehicle sun visor apparatus 1 that estimates the eye position P of the occupant as described above will be described. The characteristic operations different from the first embodiment will be discussed below.

If the position of the sun visor main body 10 operated by the control device 7 while the automatic mode is selected is not appropriate, the occupant manipulates the manual switch 22 to advance or retract the sun visor main body 10 to the appropriate position. When the occupant manipulates the modification switch 23 after adjusting the position of the sun visor main body 10, the distal end position S of the sun visor main body 10 after adjustment, and the incident angle θ of the incident light at that time are stored in the data RAM 16. Then, the CPU 18 estimates the eye position P of the occupant based on the three straight lines L obtained from three data sets (the distal end position S of the sun visor main body 10 and the incident angle θ at that time) stored in the data RAM 16. At this time, the CPU 18 determines whether the intersections formed by the three straight lines L are located at the abnormal position. If the CPU 18 determines that any of the intersections is located at the abnormal position, the data (the distal end position S and the incident angle θ) that determines the old straight line L among two straight lines L that form the intersection is deleted from the data RAM 16. The CPU 18 then estimates the eye position P again. When estimating the eye position P again, the intersection between the two straight lines L determined by two data sets (the distal end position S and the incident angle θ) stored in the data RAM 16 is estimated as the eye position P of the occupant. The estimated eye position P is then stored in the eye position RAM 17. Thereafter, while the automatic mode is selected by the occupant, the CPU 18 performs the light blocking control based on the estimated eye position P in accordance with the incident angle θ of the incident light using the control map.

As described above, the second embodiment has the following advantages in addition to the advantages (3) and (4) of the first embodiment.

(1) When the position of the sun visor main body 10 is adjusted three times or more, the eye position P is estimated using the three straight lines L (L1, L2, L6) each of which passes through the distal end position S (S1, S2, S6) of the sun visor main body 10 adjusted to several positions by the occupant and is inclined by the same angle as the incident angle θ (θ1, θ2, θ6) of the incident light. That is, when the distal end position S of the sun visor main body 10 and the incident angle θ of the incident light are specified, the eye position P of the occupant is estimated through computation performed by the CPU 18. In the second embodiment, since the eye position P of the occupant is estimated using one more straight line L as compared to the first embodiment, a position closer to the eye position desired by the occupant is estimated as the eye position P. To prevent dazzlement of the occupant due to the incident light, the incident light is simply prevented from shining on the actual eye position O of the occupant. Therefore, the appropriate light blocking control is performed by blocking light in accordance with the estimated eye position P. Furthermore, the second embodiment does not require a camera or the like to estimate the eye position P of the occupant. Therefore, the apparatus is inexpensive and has a simple structure.

(2) When estimating the eye position P, if the intersection P10 formed by the three straight lines L is located in the area G outside the vehicle 2, the data (the distal end position S and the incident angle θ) that determines the old straight line L11 among the two straight lines L11, L12 that form the intersection located in the area G is deleted from the data RAM 16. Therefore, the light blocking control is prevented from being performed based on the abnormal eye position P. Furthermore, since the data that determines the old straight line L11 among the straight lines L1, L12 that form the intersection is deleted from the data RAM 16, the latest state of the occupant is easily reflected in the eye position P estimated again.

The above embodiments of the present invention may be modified as follows.

In each embodiment, the sun visor main body 10 need not be advanced or retracted step by step in five stages. For example, the sun visor main body 10 may be advanced or retracted in less than or equal to four stages or may be advanced or retracted in greater than or equal to six stages. If the sun visor main body 10 is advanced or retracted in less than or equal to four stages, the control of the CPU 18 is easily performed. If the sun visor main body 10 is advanced or retracted in greater than or equal to six stages, the sun visor main body 10 is advanced or retracted more finely. Therefore, the light blocking control that is more comfortable for the occupant is performed.

In each embodiment, the vehicle sun visor apparatus 1 includes the discarding switch 24. However, the vehicle sun visor apparatus 1 does not need to include the discarding switch 24.

Figure 9:
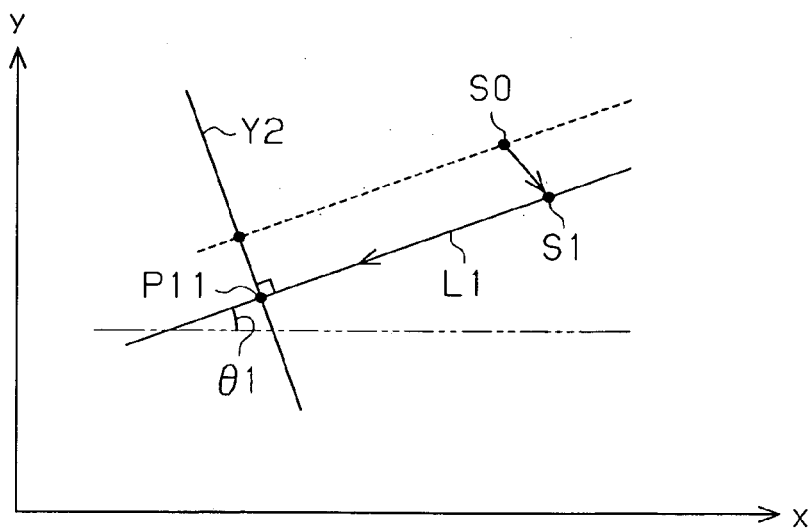
FIG. 9 is a diagram showing a method for estimating the eye position according to a modified embodiment.

In each embodiment, after the first adjustment of the position of the sun visor main body 10, the intersection between the straight line Y1, which passes through the eye position P0 of the average sized person and extends in the vertical direction of the vehicle 2, and the straight line L1 is estimated as the eye position P1 of the occupant. However, the present invention is not limited to this. For example, as shown in FIG. 9, the intersection between a first straight line, which is the straight line L1, and a second straight line, which is a straight line Y2 that passes through the eye position P0 and is perpendicular to the straight line L1, may be estimated as the eye position P11 of the occupant.

In the first embodiment, when adjusting the position of the sun visor main body 10, the intersection between the two straight lines L1, L2 is estimated as the eye position P2 from the second adjustment. However, the present invention is not limited to this. At every adjustment, the intersection between the straight line Y1, which passes through the eye position P0 of the average sized person and extends in the vertical direction of the vehicle 2 stored in the ROM 15, and the straight line L may be estimated as the eye position P of the occupant in the same manner as the estimation after the first adjustment.

In the first embodiment, the vehicle sun visor apparatus 1 includes the modification switch 23, but the vehicle sun visor apparatus 1 does not need to include the modification switch 23. For example, the CPU 18 may be designed to automatically estimate the eye position P when a certain time (for example, fifteen seconds) elapses after the position of the sun visor main body 10 is adjusted by the manual switch 22. In this case, the CPU 18 serves as instruction means. With this configuration, the occupant does not need to instruct estimation of the eye position P, and the operability of the vehicle sun visor apparatus 1 is improved.

Figure 10:
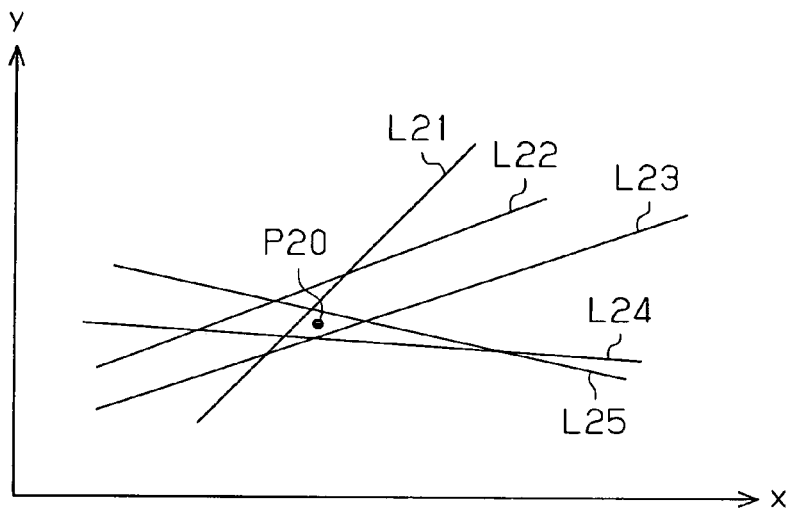
FIG. 10 is a diagram showing a method for estimating the eye position according to a modified embodiment.

In the second embodiment, the eye position P of the occupant is estimated using the three straight lines L each of which passes through the distal end position S of the sun visor main body 10 and is inclined by the same angle as the incident angle θ of the incident light. However, the number of the straight lines L used for estimating the eye position P may be n (n is a natural number greater than two (n>2)). For example, as shown in FIG. 10, if n is equal to 5, the position of the coordinate values obtained as the average of the coordinate values of the intersections formed by five straight lines L21 to L25 is estimated as the eye position P20 of the occupant. In this case, since the eye position P is estimated using greater number of straight lines L, the estimated eye position P is closer to the eye position P that the occupant feels appropriate. As a result, the CPU 18 performs the light blocking control more appropriately in accordance with the estimated eye position P.

In each embodiment, the CPU 18 performs the light blocking control based on the estimated eye position P in accordance with the incident angle θ of the incident light using the control map. However, the CPU 18 may perform the light blocking control without using the control map.

Figure 11:
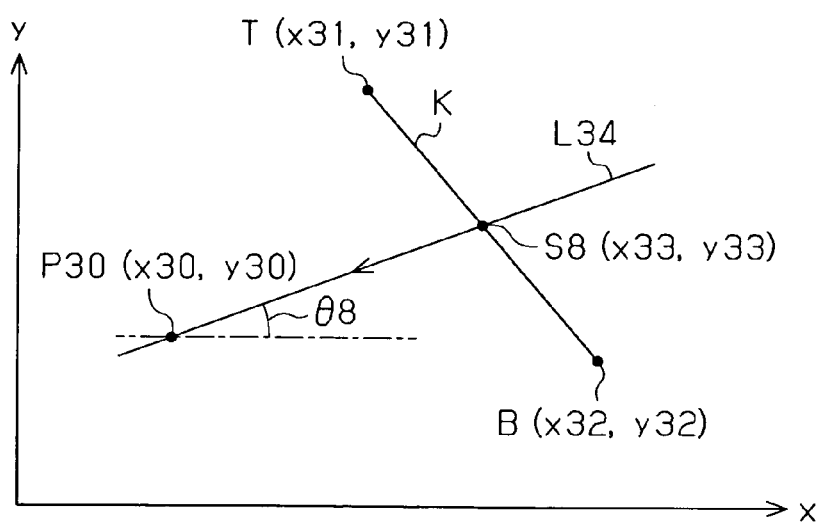
FIG. 11 is a diagram showing a method of a light blocking control according to a modified embodiment.

The light blocking control that does not use a control map will now be described with reference to FIG. 11. FIG. 11 shows an arbitrary xy-coordinate plane including an x-axis that represents the fore-and-aft direction of the vehicle 2 and a y-axis that represents the vertical direction of the vehicle 2. On the xy-coordinate plane, the coordinate values of the estimated eye position P30 is assumed to be (x30, y30). Also, the coordinate values of the distal end position T of the completely retracted sun visor main body 10 is assumed to be (x31, y31), and the coordinate values of the distal end position B of the completely advanced sun visor main body 10 is assumed to be (x32, y32). When the incident light with the incident angle θ8 (the incident angle in the vertical direction) enters the measuring area MA, the coordinate values of the distal end position S8 of the sun visor main body 10 that is advanced to an appropriate position is assumed to be (x33, y33).

When the path of the distal end of the sun visor main body 10 describes a straight line, the distal end position S8 of the sun visor main body 10 is considered to be the intersection between the straight line K, which represents the path of the distal end position of the sun visor main body 10, and a straight line L34, which passes through the estimated eye position P30 and is inclined by the same angle as the incident angle θ8 of the incident light. Thus, the straight line K, which represents the path of the distal end position of the sun visor main body 10, is represented by the following equation using the coordinate values of the distal end position T of the completely retracted sun visor main body 10, the distal end position B of the completely advanced sun visor main body 10, and the distal end position S8 of the sun visor main body 10 that is advanced to the appropriate position.

$$y33 - y31 = \frac{(y32 - y31)}{(x32 - x31)}(x33 - x31) \quad (1)$$

Also, the straight line L34, which passes through the estimated eye position P30 and is inclined by the same angle as the incident angle θ8 of the incident light, is represented by the following equation using the estimated eye position P30 and the coordinate values of the distal end position S8 of the sun visor main body 10 that is advanced to the appropriate position.

$$y33 - y30 = (x33 - x30)\cdot\tan\theta8 \quad (2)$$

The coordinate values (x33, y33) of the distal end position S8 of the sun visor main body 10 that is advanced to the appropriate position is obtained by solving the equations (1) and (2).

$$x33 = \frac{(x32-x31)(y31-y30+x30\cdot\tan\theta8)-(y32-y31)x31}{(x32-x31)\cdot\tan\theta8-(y32-y31)} \quad (3)$$

$$y33 = \frac{y32-y31}{x32-x31}\left\{\frac{(x32-x31)(y31-y30+x30\cdot\tan\theta8)-(y32-y31)x31}{(x32-x31)\cdot\tan\theta8-(y32-y31)}-x31\right\}+y31 \quad (4)$$

Therefore, the coordinate values (x33, y33) of the distal end position S8 of the sun visor main body 10 is calculated using the equations (3) and (4) when the incident angle θ8 of the incident light, which is variable, and the coordinate values (x30, y30) of the estimated eye position P30 are determined.

The CPU 18 calculates, as needed, the coordinate values (x33, y33) of the distal end position S8 of the sun visor main body 10 where the advancing amount of the sun visor main body 10 is optimal in accordance with the incident angle θ8 of the incident light and the coordinate values (x30, y30) of the estimated eye position P30. Then, the CPU 18 performs the light blocking control such that the distal end of the sun visor main body 10 is located at the position of the calculated coordinate values (x33, y33) of the distal end position S8 of the sun visor main body 10.

With this configuration, a slight change of the incident angle θ8 and a slight change of the eye position P30 are reflected in the advancing amount of the sun visor main body 10. Therefore, the CPU 18 performs the light blocking control in accordance with the eye position P30 more strictly. Furthermore, since the advancing amount of the sun visor main body 10 is not controlled step by step using the control map as in the above mentioned embodiments, the sun visor main body 10 is prevented from being advanced more than necessary. As a result, the occupant obtains a wider view as compared to the above embodiments while the sun visor main body 10 blocks the light.

According to the modified example of FIG. 11, the path of the distal end position of the sun visor main body 10 is represented by the straight line K. However, the light blocking control may be performed in a case where the distal end position of the sun visor main body 10 describes a curved path. That is, the curved line of the path described by the distal end of the sun visor main body 10 is obtained using the coordinate values of the distal end position of the completely retracted sun visor main body 10, the distal end position of the completely advanced sun visor main body 10, and the distal end position of the sun visor main body 10 that is advanced to the appropriate position. Then, the CPU 18 obtains the intersection between the curved line and the straight line L34, which passes through the estimated eye position P30 and is inclined by the same angle as the incident angle θ8 of the incident light, and performs the light blocking control such that the distal end of the sun visor main body 10 is located at the intersection.

In each embodiment, the CPU 18 estimates the eye position P by manipulating the modification switch 23 after the occupant adjusts the position of the sun visor main body 10 by manipulating the manual switch 22. However, the occupant can make the CPU 18 to estimate the eye position P by manipulating the modification switch 23 at any time even not after adjusting the position of the sun visor main body 10 by manipulating the manual switch 22.

In each embodiment, when the incident light enters the measuring area MA, the light receiving sensor 6 outputs incident light detection signals to the control device 7 in accordance with the intensity of the incident light, and the incident angle in the vertical direction and the incident angle in the horizontal direction. Then, the control device 7 obtains the intensity of the incident light, the incident angle in the vertical direction, and the incident angle in the horizontal direction. However, the light receiving sensor 6 may detect the intensity of the incident light, the incident angle in the vertical direction, and the incident angle in the horizontal direction, and the detection result may be output to the control device 7.

In each embodiment, the vehicle sun visor apparatus 1 is provided for a driver, but may be provided for the occupant in the front passenger seat.

We claim:

1. A vehicle sun visor apparatus, comprising: a light blocking device, which has a sun visor main body provided on a vehicle to block incident light; a light receiving sensor, which outputs an incident light detection signal for specifying the incident angle of the incident light; and a control device, which specifies the incident angle of the incident light based on the incident light detection signal and performs a light blocking control to block the incident light with the light blocking device,
    wherein the control device stores a reference eye position of an occupant of the vehicle, and
    wherein the control device estimates, as an eye position of the occupant, the intersection between a straight line that passes through the reference eye position and extends along the vertical direction of the vehicle and a straight line that passes through the distal end position of the sun visor main body arranged at a position appropriate for shielding the occupant from light and is inclined by the same angle as the incident angle specified by the control device, and performs the light blocking control in accordance with the estimated eye position.

2. A vehicle sun visor apparatus, comprising: a light blocking device, which has a sun visor main body provided on a vehicle to block incident light; a light receiving sensor, which outputs an incident light detection signal for detecting the incident angle of the incident light; and a control device, which specifies the incident angle of the incident light based on the incident light detection signal and performs a light blocking control to block the incident light with the light blocking device,
    wherein the control device stores a reference eye position of an occupant of the vehicle, and
    wherein the control device estimates, as an eye position of the occupant, the intersection between a first straight line that passes through the distal end position of the sun visor main body arranged at a position appropriate for shielding the occupant from light and is inclined by the same angle as the incident angle specified by the control device and a second straight line that passes through the reference eye position and is perpendicular to the first straight line, and performs the light blocking control in accordance with the estimated eye position.

3. A vehicle sun visor apparatus, comprising: a light blocking device, which has a sun visor main body provided on a vehicle to block incident light; a light receiving sensor, which outputs an incident light detection signal for detecting the incident angle of the incident light; and a control device, which specifies the incident angle of the incident light based on the incident light detection signal and performs a light blocking control to block the incident light with the light blocking device,
    wherein the control device estimates, as an eye position of an occupant, the intersection between two straight lines, each of which passes through one of two different positions that correspond to the distal end position of the sun visor main body adjusted by the occupant and is inclined by the same angle as the incident angle at the time of each adjustment, and performs the light blocking control in accordance with the estimated eye position.

4. A vehicle sun visor apparatus, comprising: a light blocking device, which has a sun visor main body provided on a vehicle to block incident light; a light receiving sensor, which outputs an incident light detection signal for detecting the incident angle of the incident light; and a control device, which specifies the incident angle of the incident light based on the incident light detection signal and performs a light blocking control to block the incident light with the light blocking device,
    wherein, on an xy-coordinate plane including an x-axis that represents the fore-and-aft direction of the vehicle and a y-axis that represents the vertical direction of the vehicle, the control device estimates, as an eye position of an occupant, the position of the coordinate values obtained as the average of the coordinate values of the intersections formed by straight lines, the number of which is n (n is a natural number greater than or equal to three), each of which passing through the coordinate values of the distal end position of the sun visor main body adjusted to a plurality of different positions by the occupant and being inclined by the same angle as the incident angle at the time of each adjustment, and the control device performs the light blocking control in accordance with the estimated eye position.

5. The apparatus according to claim 4, wherein each straight line is determined by data including the distal end position of the sun visor main body when the occupant adjusts the position of the sun visor main body and the incident angle at that time, and
    wherein the control device stores the data every time the eye position is estimated, and if any of the intersections between the straight lines is located in an area corresponding to the outside of the vehicle bounded by a line representing the path of the distal end position of the sun visor main body, the control device deletes the data that determines the old straight line among the two straight lines that form the intersection, and estimates the eye position of the occupant using the straight lines determined by the remaining data.

6. The apparatus according to claim 1, wherein the position of the sun visor main body is manually adjustable by the occupant, the apparatus further comprising;
instructing means for instructing the control device to estimate the eye position of the occupant after the occupant adjusted the position of the sun visor main body.

7. The apparatus according to claim 1, wherein the position of the sun visor main body is manually adjustable by the occupant, and
wherein the control device estimates the eye position of the occupant after a predetermined time has elapsed from when the occupant adjusted the position of the sun visor main body.

8. The apparatus according to claim 1, wherein the control device includes a storing section for storing the estimated eye position, and
the apparatus includes discarding means for deleting the estimated eye position stored in the storing section.

9. The apparatus according to claim 1, wherein the control device performs the light blocking control by moving the sun visor main body such that the distal end of the sun visor main body is arranged at the intersection between a line that represents the moving path of the distal end position of the sun visor main body and a line that passes through the eye position and is inclined by the same angle as the incident angle of the incident light.

10. The apparatus according to claim 1, further comprising selecting means for selecting either of a manual mode in which the occupant adjusts the position of the sun visor main body and an automatic mode in which the control device adjusts the position of the sun visor main body, wherein the control device estimates the eye position of the occupant based on the stopped position of the sun visor main body adjusted by the occupant while the manual mode is selected and the incident angle of the incident light at that time, and performs the light blocking control in accordance with the estimated eye position when the automatic mode is selected.

11. The apparatus according to claim 1, further comprising: selecting means for selecting either of a manual mode in which the occupant adjusts the position of the sun visor main body and an automatic mode in which the control device adjusts the position of the sun visor main body; and instructing means for instructing the control device to estimate the eye position of the occupant, wherein, when being instructed by the instructing means, the control device estimates the eye position of the occupant based on the stopped position of the sun visor main body at the time of the instruction and the incident angle of the incident light at that time, and performs the light blocking control in accordance with the estimated eye position when the automatic mode is selected.

12. The apparatus according to claim 2, wherein the position of the sun visor main body is manually adjustable by the occupant, the apparatus further comprising:
instructing means for instructing the control device to estimate the eye position of the occupant after the occupant has adjusted the position of the sun visor main body.

13. The apparatus according to claim 2, wherein the position of the sun visor main body is manually adjustable by the occupant, and
wherein the control device estimates the eye position of the occupant after a predetermined time has elapsed from when the occupant adjusted the position of the sun visor main body.

14. The apparatus according to claim 2,
wherein the control device includes a storing section for storing the estimated eye position, and
wherein the apparatus includes discarding means for deleting the estimated eye position stored in the storing section.

15. The apparatus according to claim 2, wherein the control device performs the light blocking control by moving the sun visor main body such that the distal end of the sun visor main body is arranged at the intersection between a line that represents the moving path of the distal end position of the sun visor main body and a line that passes through the eye position and is inclined by the same angle as the incident angle of the incident light.

16. The apparatus according to claim 2, further comprising selecting means for selecting either of a manual mode in which the occupant adjusts the position of the sun visor main body and an automatic mode in which the control device adjusts the position of the sun visor main body, wherein the control device estimates the eye position of the occupant based on the stopped position of the sun visor main body adjusted by the occupant while the manual mode is selected and the incident angle of the incident light at that time, and performs the light blocking control in accordance with the estimated eye position when the automatic mode is selected.

17. The apparatus according to claim 2, further comprising: selecting means for selecting either of a manual mode in which the occupant adjusts the position of the sun visor main body and an automatic mode in which the control device adjusts the position of the sun visor main body; and instructing means for instructing the control device to estimate the eye position of the occupant, wherein, when being instructed by the instructing means, the control device estimates the eye position of the occupant based on the stopped position of the sun visor main body at the time of the instruction and the incident angle of the incident light at that time, and performs the light blocking control in accordance with the estimated eye position when the automatic mode is selected.

* * * * *